(12) United States Patent
Dehlsen

(10) Patent No.: US 7,582,977 B1  
(45) Date of Patent: Sep. 1, 2009

(54) EXTENDABLE ROTOR BLADES FOR POWER GENERATING WIND AND OCEAN CURRENT TURBINES WITHIN A MODULE MOUNTED ATOP A MAIN BLADE

(75) Inventor: James G. P. Dehlsen, Montecito, CA (US)

(73) Assignee: Clipper Windpower Technology, Inc., Carpinteria, CA (US)

( * ) Notice: Subject to any disclaimer, the term of this patent is extended or adjusted under 35 U.S.C. 154(b) by 609 days.

(21) Appl. No.: 11/066,758

(22) Filed: Feb. 25, 2005

(51) Int. Cl.
- *F02B 63/04* (2006.01)
- *F03G 7/08* (2006.01)
- *H02K 7/18* (2006.01)

(52) U.S. Cl. .................................................. 290/1 R

(58) Field of Classification Search ............... 290/1 R  
See application file for complete search history.

(56) References Cited

U.S. PATENT DOCUMENTS

| | | | |
|---|---|---|---|
| 2,120,168 A * | 6/1938 | Ash, Jr. .................. 416/88 |
| 2,163,482 A * | 6/1939 | Cameron ................. 416/88 |
| 2,749,059 A * | 6/1956 | Meyers et al. ........... 244/7 R |
| 3,249,160 A * | 5/1966 | Messerschmitt ......... 416/174 |
| 3,606,571 A | 9/1971 | Wood ..................... 416/87 |
| 3,637,168 A * | 1/1972 | Ryan et al. .............. 244/7 A |
| 3,666,210 A * | 5/1972 | Look et al. .............. 244/218 |
| 3,814,351 A | 6/1974 | Bielawa ................ 244/17.19 |
| 4,160,170 A * | 7/1979 | Harner et al. ............ 290/44 |
| 4,180,372 A | 12/1979 | Lippert, Jr. ............. 416/23 |
| 4,193,005 A * | 3/1980 | Kos et al. ................ 290/44 |
| 4,329,117 A * | 5/1982 | Doman .................. 416/170 R |
| 4,584,486 A * | 4/1986 | Quynn ..................... 290/44 |
| 4,656,362 A * | 4/1987 | Harner et al. ............ 290/44 |
| 4,710,101 A | 12/1987 | Jamieson ................. 416/32 |
| 4,715,782 A * | 12/1987 | Shimmel .................. 416/32 |
| 4,815,936 A * | 3/1989 | Stoltze et al. ........... 416/9 |
| 5,203,520 A * | 4/1993 | Przygodzki et al. ...... 244/2 |
| 5,253,979 A * | 10/1993 | Fradenburgh et al. ... 416/223 R |
| 5,630,705 A | 5/1997 | Eikelenboom ........... 416/142 |
| 5,636,969 A * | 6/1997 | Matuska et al. .......... 416/87 |
| 5,642,982 A * | 7/1997 | Matuska et al. .......... 416/87 |
| 5,655,879 A * | 8/1997 | Kiely et al. ............... 416/87 |
| 6,019,578 A * | 2/2000 | Hager et al. .............. 416/87 |
| 6,030,177 A * | 2/2000 | Hager .................... 416/87 |
| 6,068,446 A * | 5/2000 | Tangler et al. .......... 416/223 R |
| 6,726,439 B2 * | 4/2004 | Mikhail et al. ........... 415/4.1 |
| 6,752,595 B2 * | 6/2004 | Murakami ............... 416/87 |
| 6,902,370 B2 * | 6/2005 | Dawson et al. .......... 415/4.1 |
| 6,923,622 B1 * | 8/2005 | Dehlsen ................. 416/87 |
| 6,940,185 B2 * | 9/2005 | Andersen et al. ........ 290/44 |
| 6,972,498 B2 * | 12/2005 | Jamieson et al. ........ 290/55 |
| 7,004,427 B2 * | 2/2006 | Gerbino ............... 244/17.25 |
| 7,071,578 B1 * | 7/2006 | Shibata et al. .......... 290/55 |

(Continued)

*Primary Examiner*—Nicholas Ponomarenko  
*Assistant Examiner*—Pedro J Cuevas  
(74) *Attorney, Agent, or Firm*—Fay Sharpe LLP (57) ABSTRACT

A power generating system wherein a turbine is mounted on top of a tower or tethered underwater. The turbine includes a rotor having a main blade section connected to a rotor hub and an extender housing mounted on a top surface of the main blade section. The extender housing has an extender blade stored therein. An adjusting device positions the extender blade between a retracted position within the extender housing and an extended position to expose more or less of the rotor to the fluid flow. A generator is connected to the turbine for generating electrical energy.

14 Claims, 3 Drawing Sheets

U.S. PATENT DOCUMENTS

| | | | |
|---|---|---|---|
| 7,419,356 B2* | 9/2008 | Stiesdal, Henrik | 416/1 |
| 7,475,847 B2* | 1/2009 | Gerbino | 244/17.25 |
| 2003/0044274 A1* | 3/2003 | Deane et al. | 416/1 |
| 2003/0091436 A1* | 5/2003 | Stiesdal | 416/1 |
| 2003/0123973 A1* | 7/2003 | Murakami | 415/4.1 |
| 2003/0223868 A1* | 12/2003 | Dawson et al. | 416/1 |
| 2003/0230898 A1* | 12/2003 | Jamieson et al. | 290/55 |
| 2004/0201220 A1* | 10/2004 | Andersen et al. | 290/44 |
| 2005/0200134 A1* | 9/2005 | Shibata et al. | 290/55 |
| 2005/0200135 A1* | 9/2005 | Shibata et al. | 290/55 |
| 2005/0201862 A1* | 9/2005 | Wastling et al. | 416/98 |
| 2005/0207889 A1* | 9/2005 | Shibata et al. | 416/132 B |
| 2005/0207890 A1* | 9/2005 | Shibata et al. | 416/132 B |
| 2005/0230979 A1* | 10/2005 | Bywaters et al. | 290/44 |
| 2005/0230980 A1* | 10/2005 | Brunet | 290/44 |
| 2005/0242233 A1* | 11/2005 | Battisti | 244/58 |
| 2005/0285406 A1* | 12/2005 | Dawson et al. | 290/44 |
| 2007/0098555 A1* | 5/2007 | Siegfriedsen | 416/132 B |
| 2007/0243060 A1* | 10/2007 | Talavera Martin | 415/140 |
| 2008/0240923 A1* | 10/2008 | Bonnet | 416/223 R |

* cited by examiner

EXTENDABLE ROTOR BLADES FOR POWER GENERATING WIND AND OCEAN CURRENT TURBINES WITHIN A MODULE MOUNTED ATOP A MAIN BLADE

CROSS-REFERENCE TO RELATED APPLICATIONS

This application is a Continuation of and claims priority under 35 U.S.C. § 119(e) to U.S. Provisional Patent Application No. 60/459,011 "Extendable Rotor Blades For Power Generating Wind And Ocean Current Turbines Within A Module Mounted Atop A Main Blade", which was filed on Feb. 28, 2004 and which is incorporated herein by reference.

BACKGROUND OF THE INVENTION

1. Field of the Invention

This invention relates to electric power-generating devices, such as wind turbines and ocean current turbines, and more particularly to an apparatus for extending and retracting extendable rotors of horizontal axis, axial flow wind or water turbines.

2. Description of the Prior Art

U.S. Pat. No. 3,606,571 of Wood entitled "Stowed Rotor" granted Sep. 20, 1971, describes a stowed rotor mounted atop the fuselage of an airplane. The rotor includes a rotatable housing unit mounted on a vertical shaft and provided with a pair of rotor blade units that telescope into the housing unit. A mechanism is provided to extend and retract the rotor blade units from the housing unit, for the purpose of providing vertical lift during takeoff and vertical landing.

An aircraft may take off vertically or may be landed vertically by extending the rotor blades after imparting operating movement to the housing and rotor blades about a shaft. Rotary motion is imparted to the shaft by motive means not shown. After takeoff, when sufficient altitude is obtained, a conventional power system, such as forward thrust engines, may be employed.

The Wood patent is concerned with a stowed rotor arrangement for producing vertical lift for an aeronautical vehicle. The housing unit is mounted on the vehicle and rotatable about an axis, which is in general alignment with the direction of lift, using a pair of rotor blades telescopically mounted in the housing unit and disposed in generally transverse relation to the axis of rotation of the housing unit.

Wind and water current applications are not concerned with producing vertical lift for an aeronautical vehicle. On the contrary, in wind and current systems the rotors are mounted on a stationary structure and are rotatable about an axis, which is in general alignment with the direction of the wind or water current. In Wood, the housing unit is mounted on the vehicle and rotatable about an axis, which is in general alignment with the direction of lift, not in alignment with the wind or water current. In wind and water current applications the rotors are employed in a fundamentally different way to achieve a fundamentally different result. That is, the rotors are in alignment with the wind or water with the result that the rotors are moved by the current to produce electricity. In Wood, the rotors are in alignment with the direction of lift with the result that the rotors are moved by an engine to produce vertical lift. Wood describes a mechanism for a variable diameter rotor for aerospace applications wherein the rotor is driven by an engine and moves perpendicularly with respect to the flowing medium. Wood does not address the requirements of a wind or ocean current application, wherein the rotors are in alignment with and are driven by a flowing medium and do not move with respect to the flowing medium.

U.S. Pat. No. 3,814,351 of Bielawa entitled "Coaxial Rotor Yaw Control" granted Jun. 4, 1974, discloses coaxial counter-rotating rotors having telescoping blade tip portions which are normally partially extended. The blades of the upper and lower rotors can be differentially extended and retracted to create a resultant net torque between the rotors. The purpose is to provide yaw control by providing telescoping blade tip portions, which are differentially operated by a pilot-operated cable system that extends the tip portions of one rotor while retracting the tip portions of the other rotor.

Each blade is comprised of a hollow spar, which forms the leading edge and is the main strength member of the blade and a tapered trailing edge portion, which completes the airfoil contour of the blade. Each blade has a tip portion of reduced chord which has one end inserted into a cavity in the outboard end of the blade spar in which it is freely slidable. The tip portion is supported by two rollers on the spar, mounted at spaced points along its leading edge on pivots and by rollers mounted on pivots carried by the spar in position to engage the top and bottom tapered surfaces of the tip portion adjacent its trailing edge.

The Bielawa patent does not address problems that arise with respect to an extendable rotor blade system that is fixed with respect to the flowing medium, whether the medium is air or water or any other fluid-flow medium.

The above prior art references describe mechanisms for aerospace applications wherein the rotor is driven by an engine and moves with respect to the flowing medium. These references do not address the requirements of a wind or ocean current applications, wherein the rotor is driven by a flowing medium and does not move with respect to the flowing medium and where durability and fatigue resistance are paramount to the success of such system, and wherein forces acting upon the rotor vary significantly during each revolution.

The mechanisms suggested in the prior art for controlling variable diameter rotors for tilt rotors and aircraft are susceptible to fatigue failures and require extensive maintenance. Wind turbines and ocean current turbines operate in environmental conditions that can quickly degrade the properties of an extension mechanism. The high maintenance requirement translates to higher energy cost, which results in a less competitive renewable energy system.

U.S. Pat. No. 4,180,372 of Lippert, Jr. entitled "Wind Rotor Automatic Air Brake" granted Dec. 25, 1979 discloses a spring-loaded pivoting end plate braking mechanism for a wind rotor. The end plate is hinged such that it is deployed by centrifugal force or a speed change detected by a sensor which controls an actuator to effect the required positioning of the brake plate into the air stream. The brake plate acts as an aerodynamic brake for wind turbines in over-speed conditions. The brake has a stationary portion fixed on the tip of the turbine rotor and a pivoting portion hinged for movement with respect to the fixed portion.

This patent teaches an aerodynamic windmill over-speed limiter which is located at the blade tip with its hinge axis transverse to the rotor blade chord such that the device has maximum effectiveness when deployed for braking and which, in its stowed position, acts to improve the aerodynamics of the rotor blade itself.

Because the brake is located at the rotor blade tip, the drag produced by the brake is at the greatest possible rotor radius such that a maximum torque braking effect is achieved. Also, when the brake plate is deployed, the trailing edge aft of the hinge line is rotated inwardly such that it is interposed over the tip area of the rotor blade. The brake, therefore, not only produces a drag at the maximum possible moment arm but, at the same time, it destroys efficient airflow over a portion of the blade that is normally very effective in driving the rotor.

It is desirable to produce the opposite effect: increasing the length of the rotor blade to improve efficient airflow over the outer extremity of the blade to increase its effectiveness in driving the rotor without introducing drag or braking.

U.S. Pat. No. 4,710,101 to Jamieson entitled "Wind Turbine" granted Dec. 1, 1987, discloses a wind turbine in which movable nose portions are located at or adjacent the leading edge of the blade and at or adjacent the tip of the blade. The nose portions are displaceable longitudinally of the blade, i.e. radially outwardly of the blade, from a normal retracted position. This moveable portion contributes to the lift of the airfoil section, and is moved to an advanced position in which drag is produced, to prevent unwanted increase in the speed of the rotation of the rotor.

The movable portion when in the normal, retracted position, will have little harmful effect on the aerodynamic shape of the airfoil section, the flow lines of the air passing from the movable portion extremely smoothly onto the remainder of the airfoil section.

The leading face of the remainder of the airfoil section has a flat or concave surface to increase the drag effect when the movable portion is in the advanced position. Further to increase the drag effect, bleed passages may lead from the leading faces of the remainder of the airfoil sections, which are exposed when the movable portions are moved to the advanced position. This bleed passages can extend to a major surface of the remainder of the respective airfoil section, to cause air to flow from the leading face to said major surface to cause separation of flow and increase drag. The portion exposed may in fact include part of the operating mechanism of the movable portion, which would even further increase the drag effect.

When the speed of rotation of the rotor reaches a value, which is the maximum value, which can be tolerated, the nose portions move radially outwardly. The nose portions move either under the action of centrifugal force against the return force of springs, or together with assistance from actuators, and the leading faces are exposed. The outward movement of the nose portions will itself cause an effective reshaping of the cross-section of the blades so they do not resemble an airfoil section at all, at the tip of the blade. This destroys lift on a section of the blade where the most power is produced. It will create much more drag on the exposed section, that is the leading face, which may be contoured or roughened to produce maximum drag. The displaced nose sections create drag at a radius beyond the normal position of the tip, where the velocity is higher and the effectiveness is greater.

The present invention is concerned with the opposite effect: increasing the length of the rotor blade to improve efficient airflow over the outer extremity of the blade to increase its effectiveness in driving the rotor without introducing drag or braking.

U.S. Pat. No. 5,630,705 of Eikelenboom entitled "Rotor Construction for Windmill" granted May 20, 1997 discloses a device for converting wind flow energy into mechanical energy. The device has a base construction and a rotor with a horizontal axis mounted on the base. The rotor has a number of elongated rotor blades, which are connected to a rotary support and extend radially therefrom. Each rotor blade or a part thereof is connected to the rotor support by a hinge connection for tilting the longitudinal axis of the rotor blade or part thereof to a predetermined orientation relative to the axis of rotation of the support. A hinge axis of the hinge connection between the rotor blade and the rotary support is directed at an acute angle both to the longitudinal axis of the rotor blade and to the axis of rotation of the support.

The maximum wind-braking area, to be used at relatively low wind speeds, is achieved when the rotor blades are at right angles to the wind direction, while pivoting the rotor blades away in the wind direction and pivoting the rotor blades around their longitudinal axes results in a lower wind-braking area to be used a relatively high wind speeds.

In order to increase the adjustability of the wind-breaking area to the actual wind speed, the rotor blades are formed by a number of elongated rotor blade parts, which are adapted to be placed in a position fully or partially overlapping each other in the lengthwise direction, or essentially in line with each other. For a minimum length of such a rotor blade, the component parts of the rotor blade fully overlap each other. A maximum length of such a rotor blade is achieved if all component rotor blade parts are placed in line with each other.

FIG. 5 of Eikelenboom illustrates an elongated, hollow first rotor blade part that is hingedly connected to an arm. The first rotor blade part contains an elongated, hollow second-rotor-blade part. The second rotor blade part can in turn contain an elongated third rotor blade part. The rotor blade parts can be shifted relative to each other in the lengthwise direction by separate mechanisms including a motor drive, a spindle and a wire cable for each moveable part fitted in the first rotor blade part. The wire is wound on the spindle. The wires can be subjected to both tensile stress and pressure, and a separate wire, spindle, motor arrangement is connected is to the first and second rotor blade parts, respectively, for the purpose of shifting the rotor blade parts in and out relative to each other.

A disadvantage of the device shown FIG. 5 of Eikelenboom is that the first rotor blade into which the second blade part slide must be completely hollow in order to accommodate the shape of the second blade. In modern large-scale turbine the blades are of such a size that reinforcing rib supports are necessary to obtain strength in large-scale wind and water current applications. The cable mechanism itself is not suitable for large scale turbines because the wires must be capable of being subjected to both tensile stress and pressure and such cables are not available for moving heavy objects.

As can be seen from the above descriptions, in the prior art it is known that the length of a blade can be adjusted such that the wind-braking area is varied. A disadvantage of the prior art devices is the number of component parts, which makes the devices complex to build, to service and to repair. Furthermore, prior art devices store an extendable rotor blade within the main blade structure. In order to make room for the extender blade, internal structural support in the main blade must be compromised, weakening the main blade. The chord size of the extender blade is also limited by the space available between spars in the main blade structure.

Commonly assigned U.S. Pat. No. 6,726,439 of Geoffrey F. Deane and Amir S. Mikhail granted Apr. 27, 2004 entitled "Retractable Rotor Blades For Power Generating Wind And Ocean Current Turbines and Means For Operating Below Set Rotor Torque Limits", discloses a control for extendable rotor blades but does not describe in detail a mechanism for extending and retracting a rotor blade on a wind or water current driven turbine.

What is needed is a mechanism for wind or ocean current turbines which will facilitate extension and retraction of extendible rotor blades and which will be lightweight, easily maintainable, and durable, that will not weaken the main blade structure.

It is desirable that extendable rotor blades be capable of being retrofitted to existing blade structures.

It is also desirable that extendable rotor blades be supported by the ribs and spars that strengthen the main rotor blades.

SUMMARY OF THE INVENTION

The present invention relates to a fluid-flow power generating system including a turbine having a rotor with a root blade and an extender blade mounted on a surface of the root blade.

In accordance with an aspect of the invention the extender blade is in a housing or pod that is mounted on a surface of the root blade.

The turbine is typically mounted on a structure (such as a tall wind tower or a tethered underwater nacelle) that is held stationary in the horizontal axis with reference to the fluid flow. The turbine includes a rotor having a main blade section connected to a rotor hub and an extender blade that telescopes into an extender housing or pod mounted atop the main blade section. An adjusting device is connected to the extender blade such that the extender blade is moveable between a retracted position relative to the main blade section and to a more exposed position to expose more or less of the rotor to fluid flow. A generator is connected to the turbine for generating electrical energy.

The invention has the advantage that it is lightweight, easily maintainable, and durable, that will not weaken the main blade structure.

The invention has the advantage that extendable rotor blades are capable of being retrofitted to existing blade structures.

The invention has the advantage that the extendable rotor blades may be supported by the ribs and spars that strengthen the main rotor blades.

The invention has the advantage that if the extendable rotor blades are supported by the ribs and spars that strengthen the main rotor blades, they can have a larger chord because they are not limited by the space between existing spars within the main blade.

BRIEF DESCRIPTION OF THE DRAWINGS

The invention will be described in detail with reference to the drawings in which.

In these figures, similar numerals refer to similar elements in the drawings. Understand that the sizes of the different components in the figures may not be to scale, or in exact proportion, and are shown for visual clarity and for the purpose of explanation.

DESCRIPTION OF THE PREFERRED EMBODIMENTS

A wind power-generating device includes an electric generator housed in a turbine, which is mounted atop a tall tower structure anchored to the ground. The turbine is free to rotate in the horizontal plane such that it tends to remain in the path of prevailing wind current. The turbine has a rotor with variable pitch blades, which rotate in response to wind current. Each of the blades has a blade base section referred to as a root blade attached to a rotor hub and a blade extension referred to as an extender blade that is variable in length to provide a variable diameter rotor. The rotor diameter is controlled to fully extend the rotor at low flow velocity and to retract the rotor as flow velocity increases such that the loads delivered by or exerted upon the rotor do not exceed set limits. The power-generating device is held by the tower structure in the path of the wind current such that the power-generating device is held in place horizontally in alignment with the wind current. The electric generator is driven by the turbine to produce electricity and is connected to power carrying cables inter-connecting to other units and/or to a power grid.

Power capture from wind and ocean current turbines is directly proportional to the cross-sectional area swept by the turbine's rotor blades, Conventional rotors utilize blades of fixed length, joined at a rotating hub. These blades may be of variable pitch (selectively rotatable about their longitudinal axes) in order to alter the angle of attack relative to the incoming fluid flow, principally for power shedding in high flow velocities. Alternatively, these blades may be fixed pitch or stall-regulated, wherein blade lift and therefore power capture falls off dramatically as wind speeds exceed some nominal value. Both variable pitch and stall regulated rotor blades with fixed diameters are well known in the art. The above-identified U.S. Pat. No. 6,726,439 B2 describes a wind or water flow energy converter comprising a wind or water flow actuated rotor assembly. The rotor comprises a plurality of blades, wherein the blades are variable in length to provide a variable diameter rotor. The rotor diameter is controlled to fully extend the rotor at low flow velocity and to retract the rotor as flow velocities increases such that the loads delivered by or exerted upon the rotor do not exceed set limits.

Refer to FIGS. 1-6, which illustrate the mechanical components of the present invention. The turbine rotor blade is comprised of a rotor with a root blade 10 and an extender blade 12 mounted on a surface of the root blade. In accordance with an aspect of the invention the extender blade 12 may be in housing or pod 14 that is mounted on a surface of the root blade 12.

The root blade 10 has spaced apart ribs defining the airfoil contour of the root blade and a lengthwise front spar and rear spar which are the main strength members of the root blade to which the ribs are attached. Each rib forms a leading edge 16 of the root blade and a tapered trailing edge 18, which completes the airfoil contour of the root blade. The ribs are covered with a fiberglass skin.

The rotor blade extension 12 may be housed within an extender blade housing or pod 14 which is mounted on a top surface 11 of the root blade 10. Four spaced apart ribs 22, 24, 26, 28 support the rotor blade extension housing 14. The ribs are extensions of the root blade ribs and are the main strength members of the rotor blade extension housing 14.

Figure 1:
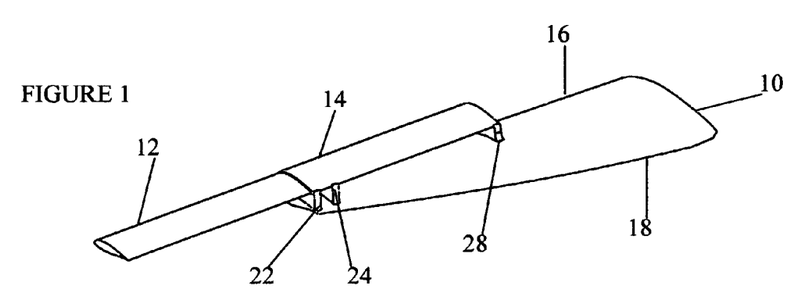
FIG. 1, is a perspective view of the present invention with the rotor extended.
Figure 2:
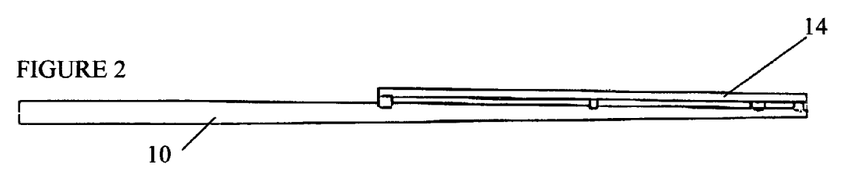
FIG. 2 is an elevation view of the present invention with the rotor fully retracted.
Figure 3:
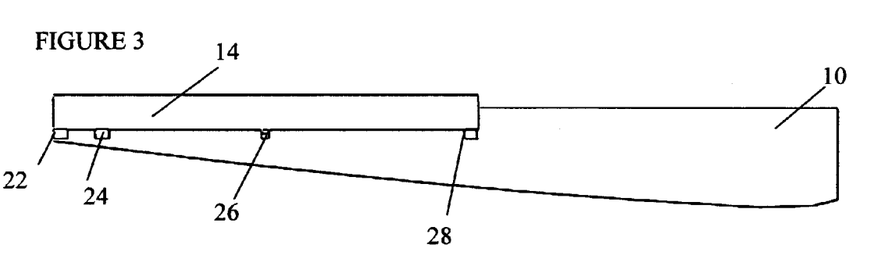
FIG. 3 is a top view of the rotor blade of FIG. 1.
Figure 4:
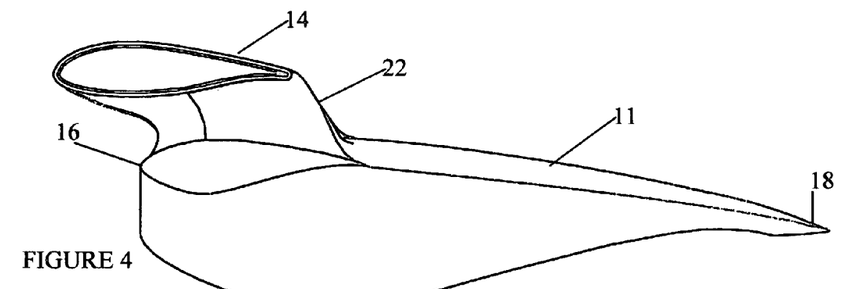
FIG. 4 is a side view of the rotor blade taken from the tip end of the blade of FIG. 3.
Figure 5:
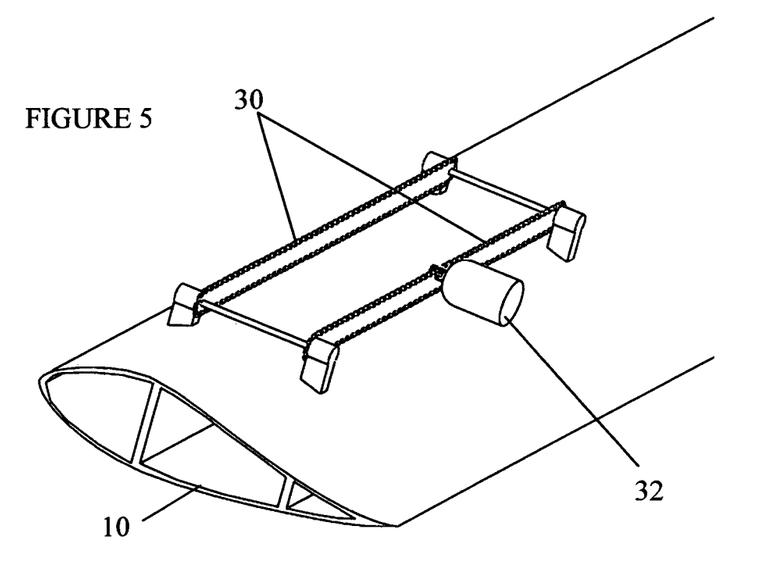
FIG. 5 is a perspective view of a portion of the rotor blade with the extender mechanism.
Figure 6:
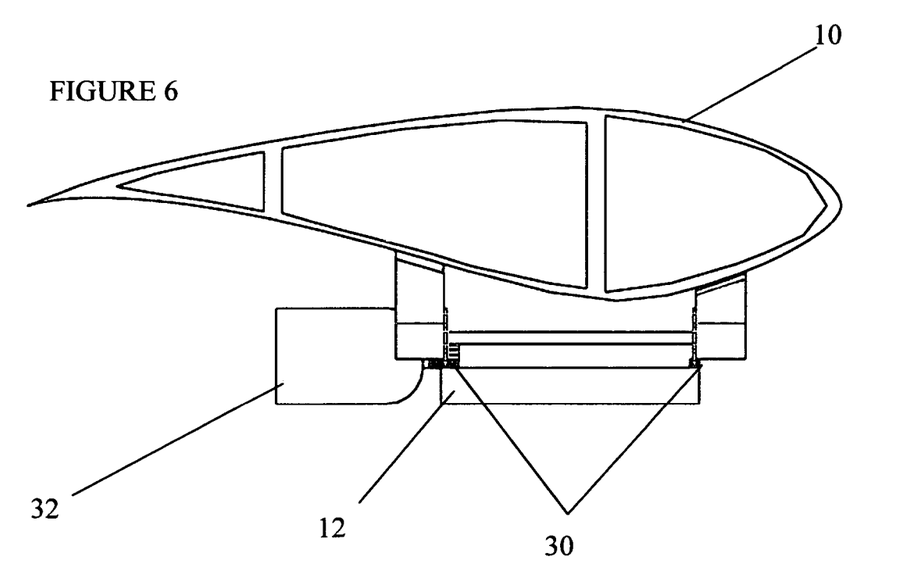
FIG. 6 is a cross-sectional view of FIG. 5.

Refer to FIG. 5 which is a perspective view of a portion of the rotor blade showing the extender mechanism and to FIG. 6, which is a sectional view of the rotor blade of FIG. 5. The extender mechanism is attached to the root blade surface 11 such that it is stationary with respect to the root blade and includes two chains 30 driven by a reversible motor 32. The chains 30 are attached to the under-carriage of the extendable blade 12 of the rotor (not shown in FIG. 5). If an extendable blade housing or pod 14 is provided, then the mechanism is located within the housing and attached to the floor of the housing such that it is stationary with respect to the housing.

Figure 7:
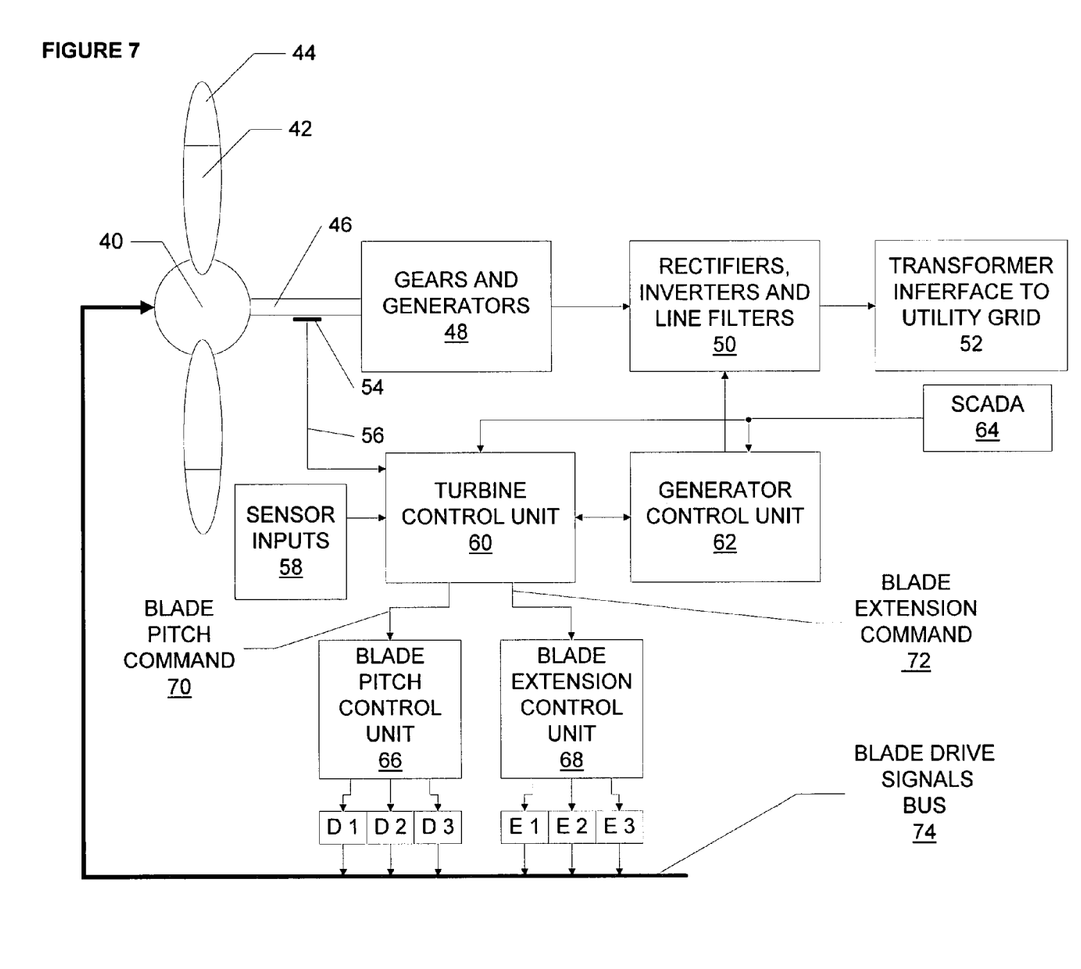
FIG. 7 is a diagram of a wind turbine system in which the present invention is embodied.

Refer to FIG. 7, which is a block diagram of a variable-speed wind turbine apparatus in accordance with the present invention. The basic components of the system are as follows. (1) A turbine drive train including a rotor hub-mounted pitch servo system 40, blade rotor including root blade 42 and extender blade 44, gearbox and a permanent magnet generator (PMG) 48, (2) generator rectifier/inverter unit 50; (3) a control system comprising a turbine control unit (TCU) 60 and generator control unit (GCU) 62, (4) a pad-mount transformer 52, and (5) SCADA interface 64 connecting the system to a utility grid.

The turbine comprises one or more rotor blades 42, 44 connected, via a rotor hub mounted pitch-angle servo, which is powered through slip rings via blade pitch signal bus 74. The hub 40 is mechanically connected to a turbine main-shaft 46, which transmits the turbine's torque to a gearbox 48. There is a sensor 54 for measuring turbine speed on the low speed shaft, the output of which is the shaft speed 56. The turbine shaft is coupled via gearbox 48 and some suitable coupling device to, in this example, a permanent magnet or wound field synchronous generator. The generator electrical output is connected to block 50, which includes a rectifier, which converts the electrical power to DC voltage and current $I_{(wind)}$ on a DC bus. The DC bus is connected to wind turbine generator (WTG) inverter. The inverter regulates the DC current and by doing so, the generator torque is controlled. The inverter regulates this DC current by synchronizing to the grid and by supplying unity power factor current into the grid system. The control of the inverter (within block 50) is provided by a generator control unit (GCU) 62. The GCU takes inputs such as grid voltage, DC bus voltage, grid current load power demand $I_{(demand\ in)}$ from the Supervisory Control and Data Acquisition (SCADA) interface 64, and commands such as torque level from a Turbine Control unit (TCU) 60. These inputs are converted into pulse-width-modulated (PWM), signals which tell a switch in the inverter 50 when to turn on and off. These switches are controlled in such a way as to maintain regulated DC current output $I_{(demand\ out)}$. Line filters on the inverter output are then used to reduce any harmonics that may have been generated by the inverter before passing power to a pad-mount transformer 52 on the utility grid.

The TCU 60 and GCU 62 in work together in a multiple generator system to stage the generators, when the turbine is operating at less than full power rating. The controller brings each generator of the plurality of synchronous generators in the turbine online sequentially in the event of low energy conditions of the source of energy (wind, water, etc.) to improve system efficiency at low power. The controller may optionally alternate the sequence in which the controller shifts the order in which the generators are brought online such that each generator receives substantially similar utilization.

The TCU 60 receives sensor information provided by sensor inputs 58 such as turbine speed, blade pitch angle, tower acceleration (vibration), nacelle acceleration (nacelle vibration), wind speed, wind direction, wind turbulence, nacelle position, AC line parameters, DC bus voltage, generator voltage, power output, and other fault related sensors. The TCU 60 has control of the principle actuators on the turbine: the generators via the GCU 62, the pitch unit (PCU) 66 and the Blade Extension Control Unit (ECU) 68. The TCU 60 performs a complicated, coordinated control function for both of these elements, and does so in a way, which maximizes the energy capture of the turbine while minimizing the machine's mechanical loads. Finally, the TCU 60 also controls a yaw system, which works to keep the turbine always pointed into the wind. The TCU 60 is also in communication with the turbine's SCADA system 64 in order to provide and receive sensor and status information.

The Turbine Control Unit (TCU) and Generator Control Unit (GCU) command the proper generator torque required based on the rotor speed and power output of the turbine inverter system as well as providing any active damping requirements. Torque control is accomplished through inverter current commands generated by the TCU and GCU. In high winds the turbine remains at a constant average output power through a constant torque command from TCU and GCU and the TCU provides a varying pitch command to the hub mounted pitch servo system.

These control commands can be independent or can be a part of a State-Space Control logic. In this circumstance, the torque and speed are a subset of the turbine state space that include other parameters such as pitch rate, pitch acceleration and various turbine loads.

The control system governs the variable rotor radius, the pitch of the rotor blades, and the rotational rate of said rotor. The TCU 60 determines a pitch angle for the blades by means of an algorithm or lookup tables. A blade pitch command 70 is sent from the TCU 60 to the Blade Pitch Control Unit (PCU) 66 which generates blade rotation drive signals D1, D2, D3, which pass over bus 74 to each of three servo motors that turn their respective blades.

The TCU 60 also determines the desired position of the extendable/retractable blade extensions 44 by means of an algorithm or lookup tables. An extension command is 72 sent by the TCU 60 to the Blade Extension Control Unit (ECU) 68 which generates blade extension drive signals E1, E2, E3, which pass over bus 74 to each of three servo motors that extend/retract their respective blade extensions.

Turbine Control Unit

U.S. Pat. No. 6,726,439 to Mikhail, et al. granted Apr. 27, 2004 for "Retractable rotor blades for power generating wind and ocean current turbines and means for operating below set rotor torque limits" discloses a wind turbine in which the rotor comprises a plurality of blades, wherein the blades of are variable in length to provide a variable diameter rotor.

In U.S. Pat. No. 6,726,439 the rotor diameter is controlled to fully extend the rotor at low flow velocity and to retract the rotor as flow velocity increases such that the loads delivered by or exerted upon the rotor do not exceed set limits. The mechanical torque (or thrust) delivered by the rotor is controlled such that the torque (or thrust) is limited to below a threshold value. This has the advantage of enabling an extended rotor blade configuration to operate within adjustable torque and thrust load limits. This enables adaptation to a multitude of wind turbine powertrain manufacturers' designs or to a variety of operating conditions through use of different control set points, and similarly enables retrofit of existing installed wind turbines.

The control system governs the variable rotor radius, the pitch of the rotor blades, and the rotational rate of the rotor, using one or more of the following sensor inputs:

measurement of power output;

measurement of rotor rotational velocity;

measurement of rotor torque;

measurement of extendable rotor blade position;

measurement of rotor blade pitch angle;

measurement of rotor blade bending load; and, measurement of bending loads upon a support structure.

SUMMARY

What has been described is a fluid flow power generating system, the fluid power being for example, wind or water current. A turbine is mounted on a structure that is held stationary with reference to the fluid flow, on a wind tower or tethered under water. The turbine includes a rotor having a main blade section connected to a rotor hub and an extender blade mounted on a top surface of the main blade section, the turbine being positioned on the structure such that the rotor is in alignment with fluid flow direction. The extender blade is moveable between a position at least partially retracted and an exposed position relative to the main blade section. An adjusting device is connected to the extender blade for the purpose of moving it. A generator is connected to the turbine for generating electrical energy.

The turbine may include an extender blade housing mounted on a top surface of the main blade section, the extender blade being stored in the extender housing. The extender blade is then moveable between a position at least partially retracted within the extender blade housing and an exposed position relative to the extender housing, wherein the extender blade travels within the housing. An adjusting device is connected to the extender blade section and anchored to the extender blade housing.

The invention has been described with reference to a wind turbine including a rotor having a root blade 10 connected to a rotor hub and an extender blade 12 on a top surface 11 of the root blade section 10. Those skilled in the art will understand that the extender blade itself 12 or the extender blade housing or pod 14 may be attached to the root blade 10 on any surface of the root blade, such as the top surface 11, the bottom surface 13, the leading edge surface 16 or the trailing edge surface 18.

While the invention has been particularly shown and described with reference to preferred embodiments thereof, it will be understood by those skilled in the art that the foregoing and other changes in form and detail may be made therein without departing from the scope of the invention.

What is claimed is:

1. A fluid-flow power generating system, characterized by:
    a turbine mounted on a structure that is held stationary with reference to a fluid flow;
    said turbine including a rotor with a root blade, said turbine being positioned on said structure such that said rotor is in alignment with fluid flow direction;
    said root blade having an airfoil contour defined by a leading edge, a trailing edge, a top surface and a bottom surface;
    a housing fixedly mounted to one of said top and bottom surfaces of said root blade and located externally thereof;
    an extender blade supported by said housing and slidably mounted therein;
    an extension mechanism attached to said extender blade such that said extender blade is variable in length to provide a variable diameter rotor;
    a rotor control connected to said extender mechanism, which adjusts power capture and loading of said rotor through extension and retraction of said extender blade to increase and decrease the cross-sectional area of fluid flow swept by said rotor; and,
    an electrical generator connected to said turbine for generating electrical energy.

2. A fluid-flow power generating system comprising:
    a turbine mounted on a structure that is held stationary with reference to said fluid flow;
    said turbine including a rotor having a root blade connected to a rotor hub;
    said root blade having an airfoil contour defined by a leading edge, a trailing edge, a top surface and a bottom surface;
    a pod fixedly mounted on said top surface of said root blade;
    an extender blade slidably mounted in said pod;
    an extension mechanism attached to said extender blade;
    wherein said extender blade and said extension mechanism are located in a said pod, and wherein said extender blade is variable in length to provide a variable diameter rotor;
    said turbine being positioned on said structure such that said rotor is in alignment with fluid-flow direction;
    said extender blade being moveable between a position at least partially retracted and an extended position relative to said pod; and,
    a generator connected to said turbine for generating electrical energy.

3. The fluid flow power generating system of claim 2 wherein:
    said root blade is formed by ribs connected to spars;
    said ribs defining a framework for said top surface upon which said pod is mounted, at least one of said ribs extending outwardly from said top surface to provide support for said pod.

4. The fluid flow power generating system of claim 2 wherein:
    said root blade is formed by ribs connected to spars;
    said adjusting mechanism located within said pod is attached to said pod such that said adjusting mechanism is stationary with respect to said pod;
    said ribs defining a framework for said top surface upon which said pod is mounted, at least one of said ribs extending outwardly from said top surface upon which said pod is mounted to provide support for said pod.

5. A fluid-flow power generating system comprising:
    a turbine mounted on a structure that is held stationary with reference to said fluid flow;
    said turbine including a rotor having a root blade having an airfoil contour defined by a leading edge, a trailing edge, a top surface and a bottom surface;
    a fixed extender blade housing externally mounted on either said top surface or said bottom surface of said root blade;
    said turbine being positioned on said structure such that said rotor is in alignment with fluid flow direction;
    said rotor including an extender blade that is variable in length to provide a variable diameter rotor, said extender blade being stored in said extender blade housing;
    said extender blade being moveable between a position at least partially retracted within said extender blade housing and an exposed position relative to said extender blade housing;
    an adjusting mechanism anchored to said extender blade housing and connected to said extender blade in said extender blade housing; and,
    a generator connected to said turbine for generating electrical energy.

6. The fluid flow power generating system of claim 5 wherein said extender blade travels within said extender blade housing.

7. For use with a turbine including a rotor having a root blade connected to a rotor hub, said root blade having an airfoil contour defined by a leading edge, a trailing edge, a top surface and a bottom surface, a fluid-flow power generating method comprising steps of:
  A. mounting said turbine on a structure that is held stationary with reference to said fluid flow, said turbine including a rotor having a root blade connected to a rotor hub;
  B. mounting an extender blade that is variable in length to provide a variable diameter rotor and an extension mechanism in a fixed housing located externally on either said top surface or said bottom surface of said root blade;
  C. maintaining said turbine in alignment with fluid-flow direction;
  D. moving said extender blade between a position at least partially retracted in said housing and an extended position relative to said root blade housing by activating said extender mechanism; and,
  E. converting an output of said turbine to electrical energy.

8. The fluid-flow power generating method of claim 7 wherein said step D includes a step of:
  extending said extender blade at low flow velocity and retracting said extender blade as flow velocity increases such that loads delivered by or exerted upon said rotor do not exceed set limits.

9. The fluid flow power generating system of claim 1 wherein:
  said root blade is formed by ribs connected to spars;
  said ribs defining a framework for said top surface upon which said pod is mounted, at least one of said ribs extending outwardly from said top surface to provide support for said pod.

10. The fluid flow power generating system of claim 1 wherein:
  said root blade is formed by ribs connected to spars;
  said extender blade and said extension mechanism being located in a pod, said pod being mounted on said top surface of said root blade;
  said extension mechanism located within said pod being attached to said pod such that it is stationary with respect to said pod;
  said ribs defining a framework for said top surface upon which said pod is mounted, at least one of said ribs extending outwardly from said top surface upon which said pod is mounted to provide support for said pod.

11. A fluid-flow power generating system including a rotor comprising:
  a root blade having an airfoil contour defined by a leading edge and a trailing edge and surfaces including a top surface and a bottom surface;
  a housing located outwardly of and fixedly mounted to one of the top and bottom surfaces of said root blade;
  an extender blade slidably mounted in said housing; and
  an extension mechanism attached to said extender blade, wherein a length of extension of said extender blade from said housing is variable to provide a variable diameter rotor.

12. The system of claim 11 further comprising at least one rib for connecting said housing to said root blade.

13. The system of claim 12 wherein a plurality of spaced ribs connect said housing to said root blade.

14. The system of claim 11 further comprising a rotor control connected to said extension mechanism, which adjusts power capture and loading of said rotor through extension and retraction of said extender blade to increase and decrease the cross-sectional area of fluid flow swept by said rotor.

* * * * *